United States Patent
Zak et al.

(10) Patent No.: US 11,226,056 B2
(45) Date of Patent: Jan. 18, 2022

(54) SERVOVALVE

(71) Applicant: Hamilton Sundstrand Corporation, Charlotte, NC (US)

(72) Inventors: Maciej Zak, Wroclaw (PL); Marek Jedlinski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/381,045

(22) Filed: Apr. 11, 2019

(65) Prior Publication Data

US 2019/0331256 A1    Oct. 31, 2019

(30) Foreign Application Priority Data

Apr. 26, 2018  (EP) .................................... 18461552

(51) Int. Cl.
*F16K 49/00* (2006.01)
*F16K 1/18* (2006.01)
*F16K 1/30* (2006.01)
*H02K 26/00* (2006.01)

(52) U.S. Cl.
CPC ............... *F16K 49/00* (2013.01); *F16K 1/18* (2013.01); *F16K 1/304* (2013.01); *H02K 26/00* (2013.01)

(58) Field of Classification Search
CPC ............ F16K 49/00; F16K 1/18; F16K 1/304; H02K 26/00; H02K 5/20; H02K 1/12; H02K 9/02; H02K 9/12; F15B 13/0438; F15B 21/0423; F15B 21/04; F15B 2211/62; F15B 31/0682; F15B 49/005
See application file for complete search history.

(56) References Cited

U.S. PATENT DOCUMENTS

| | | | |
|---|---|---|---|
| 3,457,955 A * | 7/1969 | Kleiner | F16K 31/0682 137/625.44 |
| 3,556,150 A | 1/1971 | King et al. | |
| 3,662,784 A * | 5/1972 | Perhach | F15B 13/0438 137/625.62 |
| 3,857,541 A | 12/1974 | Clark | |
| 4,538,643 A | 9/1985 | Goedecke et al. | |
| 5,191,618 A | 3/1993 | Hisey | |

(Continued)

FOREIGN PATENT DOCUMENTS

| EP | 2738915 A2 | 6/2014 |
|---|---|---|
| EP | 2741403 A2 | 6/2014 |
| JP | 2018025233 A | 2/2018 |

OTHER PUBLICATIONS

EPO Official Letter for Application No. 18461552.4, dated May 20, 2020, 9 pages.

(Continued)

*Primary Examiner* — Umashankar Venkatesan
*Assistant Examiner* — Andrew J Rost
(74) *Attorney, Agent, or Firm* — Cantor Colburn LLP

(57) ABSTRACT

There is provided an apparatus comprising a torque motor comprising a spring, armature, flapper assembly ("SAFA"), a body, wherein the spring, armature, flapper assembly is mounted onto the body, and a cap enclosing the spring, armature, flapper assembly. One or more cooling passages are provided within the body and are configured to receive cooling air and direct the cooling air onto the spring, armature, flapper assembly of the torque motor.

12 Claims, 4 Drawing Sheets

(56) References Cited

U.S. PATENT DOCUMENTS

| | | | | |
|---|---|---|---|---|
| 5,465,757 | A * | 11/1995 | Peters | F15B 13/0438 137/625.65 |
| 5,697,401 | A * | 12/1997 | Shinoda | F15B 13/0438 137/625.62 |
| 5,806,565 | A * | 9/1998 | Kadlicko | F15B 13/0402 137/625.63 |
| 6,755,205 | B1 * | 6/2004 | Hoemke | F15B 13/0438 137/625.62 |
| 7,726,340 | B2 * | 6/2010 | Druhan | F15B 13/0436 137/625.63 |
| 8,522,821 | B2 * | 9/2013 | Olson | H02K 26/00 137/625.62 |
| 9,377,122 | B2 * | 6/2016 | Druhan | F16K 27/048 |
| 9,404,513 | B2 * | 8/2016 | Baker | F15B 13/0438 |
| 2013/0283815 | A1 | 10/2013 | Simpson | |
| 2015/0276083 | A1 | 10/2015 | Druhan et al. | |
| 2016/0049230 | A1 | 2/2016 | Cichon | |
| 2016/0102677 | A1 | 4/2016 | An et al. | |

OTHER PUBLICATIONS

Extended European Search Report for International Application 18461552.4 dated Jul. 18, 2018, 11 pages.

EPO Official Letter for Application No. 18461552.4, dated Oct. 21, 2020 57 pages.

* cited by examiner

SERVOVALVE

FOREIGN PRIORITY

This application claims priority to European Patent Application No. 18461552.4 filed Apr. 26, 2018, the entire contents of which is incorporated herein by reference.

FIELD

The present disclosure relates generally to an electrohydraulic valve ("EHV"), and more specifically to an electrohydraulic servovalve having specific cooling features.

BACKGROUND

Electrohydraulic valves ("EHVs") are used in a number of applications to control how hydraulic or pneumatic fluid is ported to a hydraulically or pneumatically controlled device, for example an actuator.

These and similar types of valve, for example a pneumatic or fuel servovalve, may incorporate a torque motor comprising a magnet assembly, armature and a flapper. The magnet assembly may incorporate electromagnets to control movement of the armature. The flapper is coupled to the armature and extends into a controlling medium, for example a flow of hydraulic fluid. Thus, movement of the armature causes corresponding movement of the flapper, which controls the fluid pressure and/or fluid flow of the hydraulic fluid.

Electrohydraulic valves may be exposed to high temperature environments, and this can have a negative influence on some of the more temperature-sensitive components of the valve. The problem could be related to only a few parts inside the servovalve, for example the epoxy resin within the coils, any of the sealing gaskets or other rubber components within the valve, or even the body itself (which may be, for example, made from aluminium).

Due to high temperatures (say, above 260° C. or 500° F.), the above components may not present a perfect solution for servovalve components. However, they may be a compromise, since investing in other materials that meet all the criteria could make the EHV very expensive, or perhaps non-optimum for other temperatures.

It is desired to improve the capability of a servovalve to withstand high temperatures.

SUMMARY

In accordance with an aspect of the disclosure, there is provided an apparatus comprising a torque motor comprising a spring, armature, flapper assembly ("SAFA"), a body, wherein the spring, armature, flapper assembly is mounted onto the body, and a cap enclosing the spring, armature, flapper assembly, wherein one or more cooling passages are provided within the body and are configured to receive a fluid (e.g., a cooling fluid such as cooling air) and direct the fluid onto the spring, armature, flapper assembly of the torque motor.

Conventional arrangements typically do not provide cooling of the torque motor, and more specifically direct cooling of the spring, armature, flapper assembly of a torque motor, as described above, which means that the servovalve has a better capability of withstanding high temperatures.

In accordance with an aspect of the disclosure, there is provided a method of cooling a torque motor comprising a spring, armature, flapper assembly ("SAFA"). The method comprises locating the spring, armature, flapper assembly on a body, locating a cap over the body so as to at least partially enclose the spring, armature, flapper assembly, and providing one or more cooling passages within the body, wherein each cooling passage is configured to direct a fluid (e.g., a cooling fluid such as cooling air) at least partially onto the spring, armature, flapper assembly.

The step of providing one or more cooling passages within the body may comprise machining each of the cooling passages into the body from a first side of the body to a second, opposite side of the body.

The step of providing one or more cooling passages may comprise providing at least two (or only two) cooling passages located on diametrically opposed sides of a flapper of the spring, armature, flapper assembly.

The torque motor may comprise a pair of electromagnetic coils, and each of the one or more cooling passages may be configured to direct the fluid between the pair of electromagnetic coils.

The cap may comprise a base and a sidewall extending from the base to a rim, and the rim may be hermetically sealed against a surface of the body.

The cap may define an interior volume. The interior volume may be defined as radially inwards of the sidewall. The spring, armature, flapper assembly may be located within the interior volume of the cap and the cooling passages may be configured to direct the fluid into the interior volume so as to cool one or more components of the spring, armature, flapper assembly located within the interior volume.

The apparatus may further comprise at least two (or only two) cooling passages located on diametrically opposed sides of a flapper of the spring, armature, flapper assembly. Providing two cooling passages in this manner means that cooling can be optimised whilst reducing the number of cooling passages required to cool the torque motor.

The body may comprise a portion configured to receive a flapper of the spring, armature, flapper assembly. The portion may be elongated and extend from the surface of the body to which the cap (discussed above) is hermetically sealed against. The one or more cooling passages may be configured to direct the fluid at least partially onto the portion configured to receive the flapper of the spring, armature, flapper assembly. This directs the fluid onto the centre of the torque motor, and the spring, armature, flapper assembly thereof, such that the fluid can advantageously cool this portion before being distributed to the remainder of the torque motor.

The torque motor may further comprise a pole piece, and each of the one or more cooling passages may be configured to direct the fluid through an aperture formed in the centre of the pole piece. This advantageously directs the fluid through the pole piece to the centre of the torque motor.

The pole piece may be a substantially annular member comprising an outer radial surface and an inner radial surface, wherein the inner radial surface defines the aperture and an outlet of each of the cooling passages is at least partially located radially inward of the inner radial surface.

Each cooling passage may comprise a central axis (e.g., a central, longitudinal axis), and the central axis of each cooling passage may extend (e.g., out of the cooling passage) through the aperture of the pole piece. In a further refinement, each cooling passage may be substantially straight throughout its length, or at least between a mid-point of the cooling passage and its respective outlet, such that the fluid is focused through the centre of the pole piece, or onto the surface to which it is aimed.

The cooling passages may be configured to direct the fluid onto a first side of the torque motor, and the apparatus may comprise a fluid outlet located on a second side of the torque motor, wherein the second side of the torque motor may be opposite the first side of the torque motor, such that the fluid enters the torque motor on the first side thereof, and exits the torque motor on a second, opposite side thereof. This means that the fluid advantageously travels across the torque motor from one side to the other, thereby cooling the torque motor effectively.

The torque motor may comprise a pair of electromagnetic coils, and an outlet of each of the cooling passages may be at least partially located between the pair of electromagnetic coils, such that fluid exiting each of the one or more cooling passages in use is directed between the pair of electromagnetic coils. A volume may be defined between the pair of electromagnetic coils, and each of the one or more cooling passages is configured to direct the fluid into the volume defined between the pair of electromagnetic coils. This volume forms the largest portion of empty space inside the torque motor, and it has been found that directing cooling into this volume can lead to optimum cooling of the torque motor.

BRIEF DESCRIPTION OF THE DRAWINGS

Various embodiments will now be described, by way of example only, and with reference to the accompanying drawings in which.

DETAILED DESCRIPTION

Figure 1:
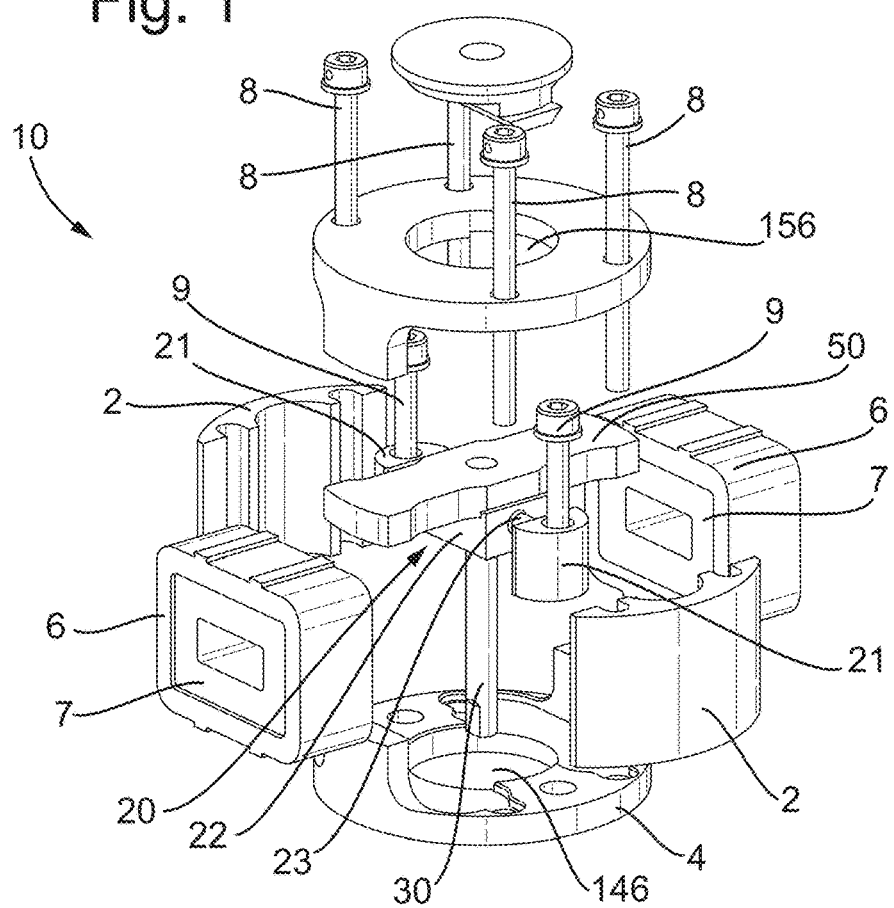
FIG. 1 shows an exploded view of a torque motor.
Figure 2:
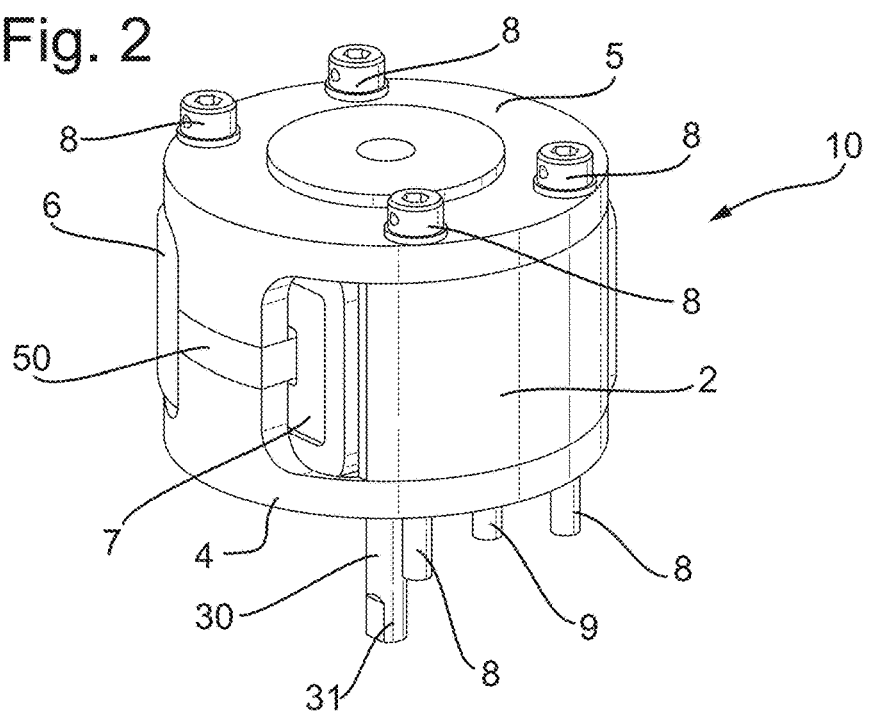
FIG. 2 shows an assembled view of the torque motor of FIG. 1.
Figure 3:
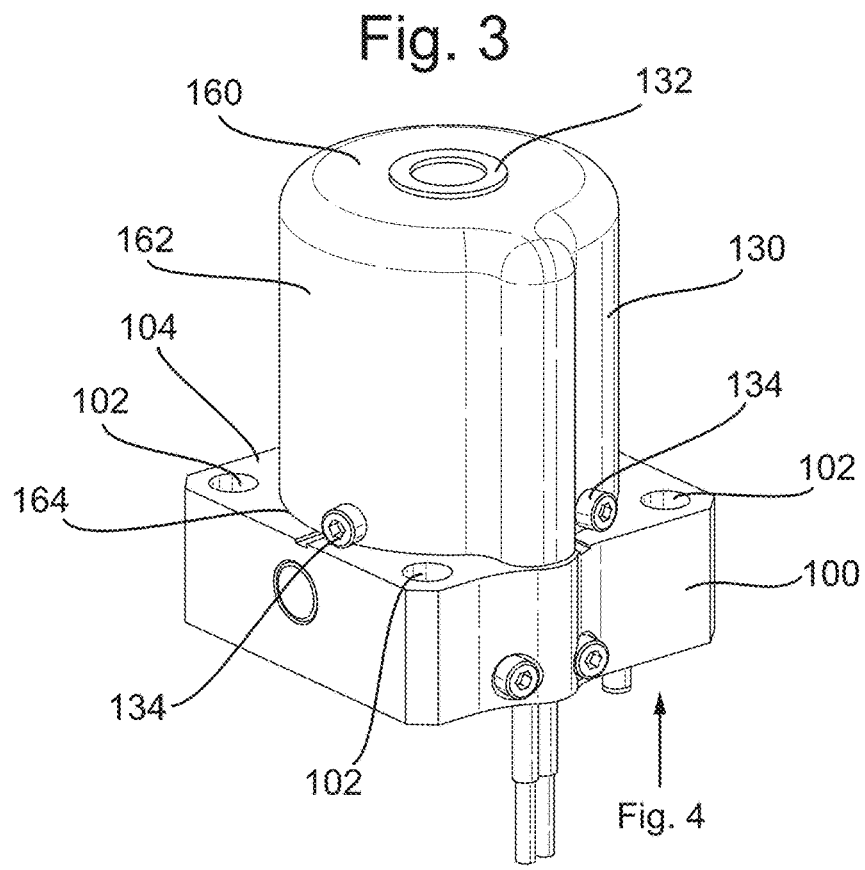
FIG. 3 shows an assembly in accordance with an aspect of the present disclosure, which contains the torque motor of FIGS. 1-2 within.
Figure 4:
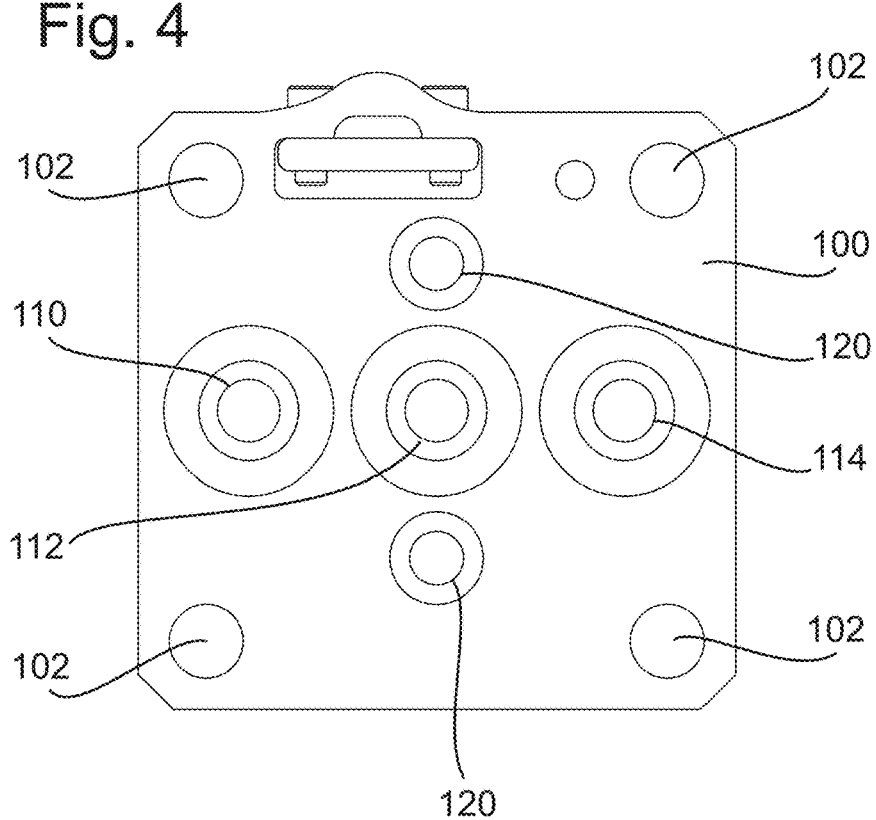
FIG. 4 shows a bottom view of the assembly of FIG. 3

Referring to FIGS. 1 and 2, an exploded view (FIG. 1) and a perspective, assembled view (FIG. 2) of one embodiment of a torque motor 10 for an electrohydraulic valve (EHV) is shown.

The torque motor 10 includes permanent magnets 2, a lower pole piece 4 and an upper pole piece 5. The torque motor 10 additionally includes electromagnets, each comprising rubber cover 6 and an electromagnetic coil 7. The permanent magnets 2, lower and upper pole pieces 4, 5 and electromagnets are held together by first screws 8, as shown in FIG. 2.

As shown in FIG. 1, a torsion bridge 20 may be coupled to the lower pole piece 4 using second screws 9. The torsion bridge 20 comprises two outer connecting portions 21. The second screws 9 may extend through apertures in the outer connecting portions 21, into corresponding apertures in the lower pole piece 4 and connect to the torque motor housing (not shown) to couple the torsion bridge 20 to the lower pole piece 4.

The torsion bridge 20 further comprises a central connecting portion 22 that is coupled to each of the outer connecting portions 21 by respective resilient members 23 (only one resilient member 23 is shown in FIG. 1). In the illustrated embodiment, the resilient members 23 are in the form of cylindrical bars extending between the central connecting portion 22 and the outer connecting portions 21, but any suitable resilient member may be used.

A flapper 30 extends through and is coupled to the central connecting portion 22 of the torsion bridge 20 such that it moves with the central connecting portion 22 of the torsion bridge 20.

An armature 50 is also coupled to the central connecting portion 22 of the torsion bridge 20, as well as the flapper 30, such that it moves with the central connecting portion 22 of the torsion bridge 20, and with the flapper 30. The centre, or pivot portion of the armature 50 comprises an aperture into which the flapper 30 extends. The armature 50 comprises first and second arms that extend from the centre, or pivot portion as shown in FIG. 1. The flapper 30 may be directly connected (e.g., brazed) to the armature 50, and the armature 50 may be directly connected (e.g., brazed) to the torsion bridge 20. The flapper 30 may not be directly connected to the torsion bridge 20 (although it may contact it in use).

The armature 50, flapper 30, central connecting portion 22 and resilient members 23 form a spring, armature, flapper assembly ("SAFA"). The SAFA moves as a single unit relative to the remainder of the torque motor 10 components. The outer connecting portions 21 do not move with the SAFA due to their connection to the torque motor housing via lower pole piece 4 and via second screws 9.

In use, the SAFA can rotate around the axis of the resilient members 23. During such rotation, the armature 50 pivots about its centre, or pivot portion, and this causes the lower end 31 (see FIG. 2) of the flapper 30 to move left and right. When the torque motor forms part of an electrohydraulic valve, the lower end 31 of the flapper extends into a flow of hydraulic fluid. Thus, the left and right movement of the lower end 31 of the flapper 30 controls flow of hydraulic fluid in the electrohydraulic valve by opening and closing nozzles in the valve body (not shown).

When assembled (see FIG. 2), the electromagnetic coils 7 of the electromagnets surround respective portions of the first and second arms of the armature 50. The electromagnets are mounted between the lower pole piece 4 and the upper pole piece 5 and are additionally connected to a source of electrical current (not shown). Rubber covers 6 are provided around electromagnetic coils 7 to avoid damage during vibrations.

The rotational position of the armature 50, and hence movement of the flapper 30, is controlled by energising the electromagnetic coils 7 of the electromagnets. The position of the flapper 30, i.e., left or right, depends on the direction of electrical current applied to the electromagnetic coils 7, and is also proportional to the input electrical current.

The permanent magnets 2, lower pole piece 4, upper pole piece 5 and armature 50 are all formed from a magnetically permeable material. For example, the permanent magnets 2 may be made from Aluminium, Nickel and/or Cobalt. The permanent magnets 2 may be made from an iron alloy such as alnico (a mixture of Aluminium, Nickel and/or Cobalt), or the permanent magnets 2 may be made, at least in part, from neodymium. The lower pole piece 4, upper pole piece 5 and armature 50 may be made from a soft magnetic, e.g., a Nickel Iron alloy.

The torque motor 10 is configured to sit on top of a fixed body 100, and within a cap or cover 130, which can be seen in FIGS. 3-6 which show a servovalve assembly comprising the torque motor 10 shown in FIGS. 1 and 2.

The body 100 is a single piece and comprises a number of ports to allow hydraulic fluid to flow from a supply flow of hydraulic fluid to a return flow of hydraulic fluid. As shown in more detail in FIG. 4, the body 100 comprises a supply port 110, a control port 112 and a return port 114. The function of these ports is considered to be known in the art and will not be described in more detail herein. The body 100 comprises a plurality of holes 102 for mounting the body 100 to a component or system.

In addition to the standard ports, a plurality of (in this case two) cooling inlet ports 120 are provided in the lower surface of the body 100, which are configured to be connected to a supply of cooling fluid (e.g., air). A cooling outlet port 132 is provided in the cap 130 to allow cooling fluid introduced into the first and second cooling inlet ports 120 to be expelled as described in more detail below.

Figure 5:
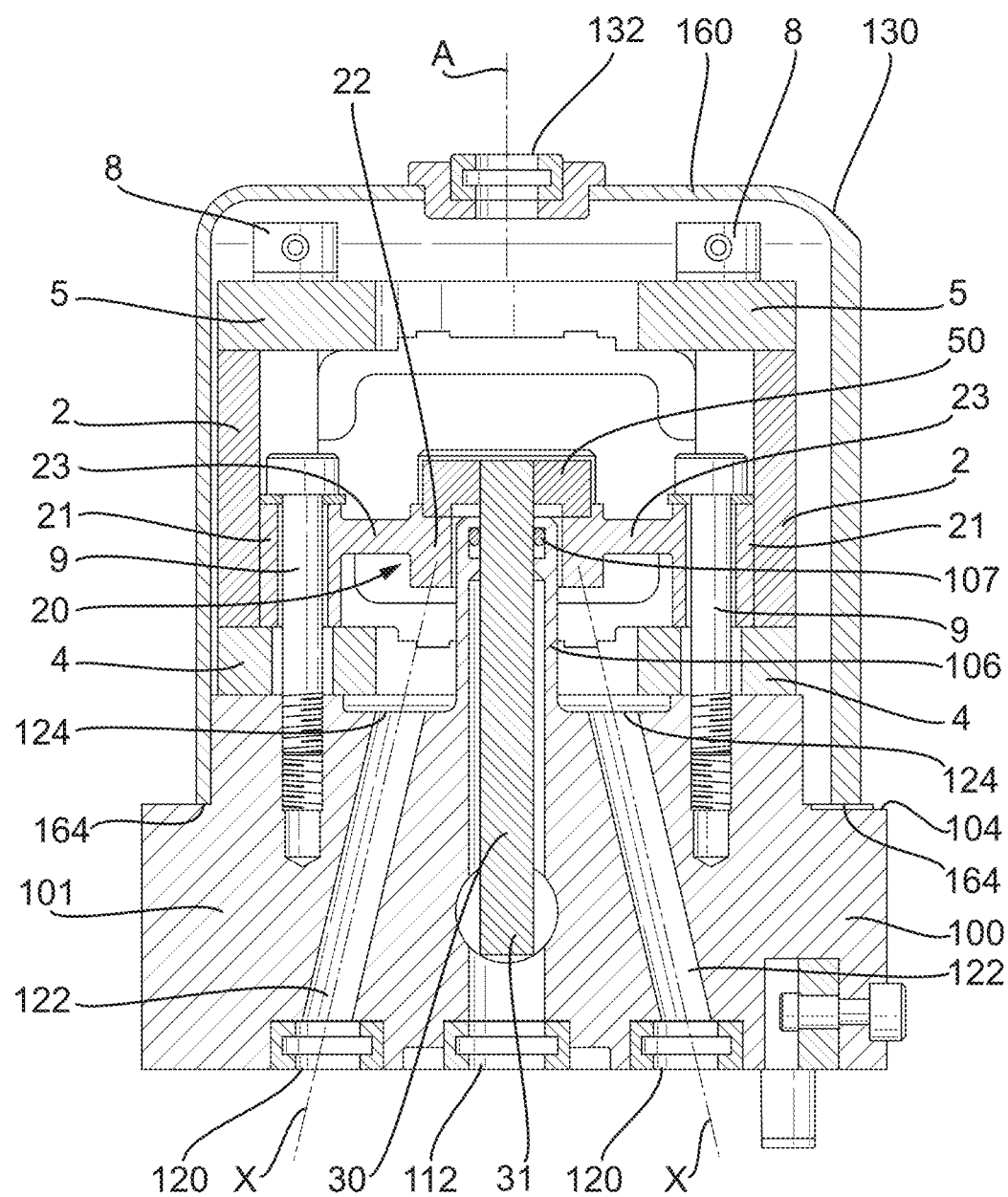
FIG. 5 shows a cross-sectional view of the assembly of FIG. 3.

FIG. 5 shows a cross-section of the torque motor 10, body 100 and cap 130 in its assembled state. The cap 130 may be fixed to the body 100 using fasteners 134 (see FIG. 4) or any other suitable method. The cap 130 is provided in the form of an inverted cup, wherein a base 160 of the cup extends over the top of the torque motor 10, is substantially flat and comprises the cooling outlet port 132. A substantially cylindrical side portion 162 extends from the base 160 of the inverted cup forming the cap 130, and extends around the torque motor 10 to a circumferential rim 164. The circumferential rim 164 is held against the body 100 using the fasteners 134, and optionally forms a hermetic seal against a shoulder portion 104 of the body 100. Thus, the torque motor 10 is contained within an interior volume of the cap 130, which encloses the torque motor 10 and protects its components from, e.g., ingress of debris.

The body 100 comprises a substantially square base 101 with a cylindrical portion 103 extending from the base 101. The shoulder portion 104 of the body 100 forms the upper surface of the base 101 surrounding the cylindrical portion 103 that extends therefrom. A central extension 106 protrudes from the cylindrical portion 103 and is configured to receive the flapper 30. The central extension 106 may be sealed against the flapper 30 using any suitable ceiling mechanism, for example a seal or gasket 107.

The body 100 comprises cooling passages 122 that each extend from a respective cooling inlet port 120 to the interior volume within the cap 130 containing the torque motor 10. Each cooling passage extends from a respective cooling inlet port 122 a cooling outlet 124 that is located adjacent to the central extension 106 containing the flapper 30 and below the torsion bridge 20.

The lower pole piece 4 is a substantially flat, annular member, having an outer diameter defined by its outer radial surface 142, as well as an inner diameter defined by its inner radial surface 144. The inner radial surface 144 of the lower pole piece 4 may define an aperture 146 therethrough, which can also be seen in FIG. 1. In various embodiments, the cooling outlet 124 of each of the cooling passages 122 is at least partially located radially inward of the inner radial surface 144 of the lower pole piece 4. This ensures that cooling fluid is able to flow directly into the aperture 146 and onto the inner parts of the torque motor 10, such as the torsion bridge 20 and armature 50. In an further refinement, a central axis X of each cooling passage 122 may extend through the aperture 146 of the lower pole piece 4.

The upper pole piece 5 is also a substantially flat, annular member, having an outer diameter formed by its outer radial surface 152, as well as an inner diameter formed by its inner radial surface 154. The inner radial surface 154 of the upper pole piece 5 may define an aperture 156 therethrough, which can also be seen in FIG. 1. In various embodiments, the cooling outlet port 132 provided in the cap 130 is located directly above the aperture 156 of the upper pole piece 5. In other words, a central axis A of the cooling outlet port 132 (see FIG. 5) extends through the aperture 156 of the upper pole piece 5. In the illustrated embodiment, the central axis A of the cooling outlet port 132 is coincident with that of the aperture 156 of the upper pole piece 5.

Figure 6:
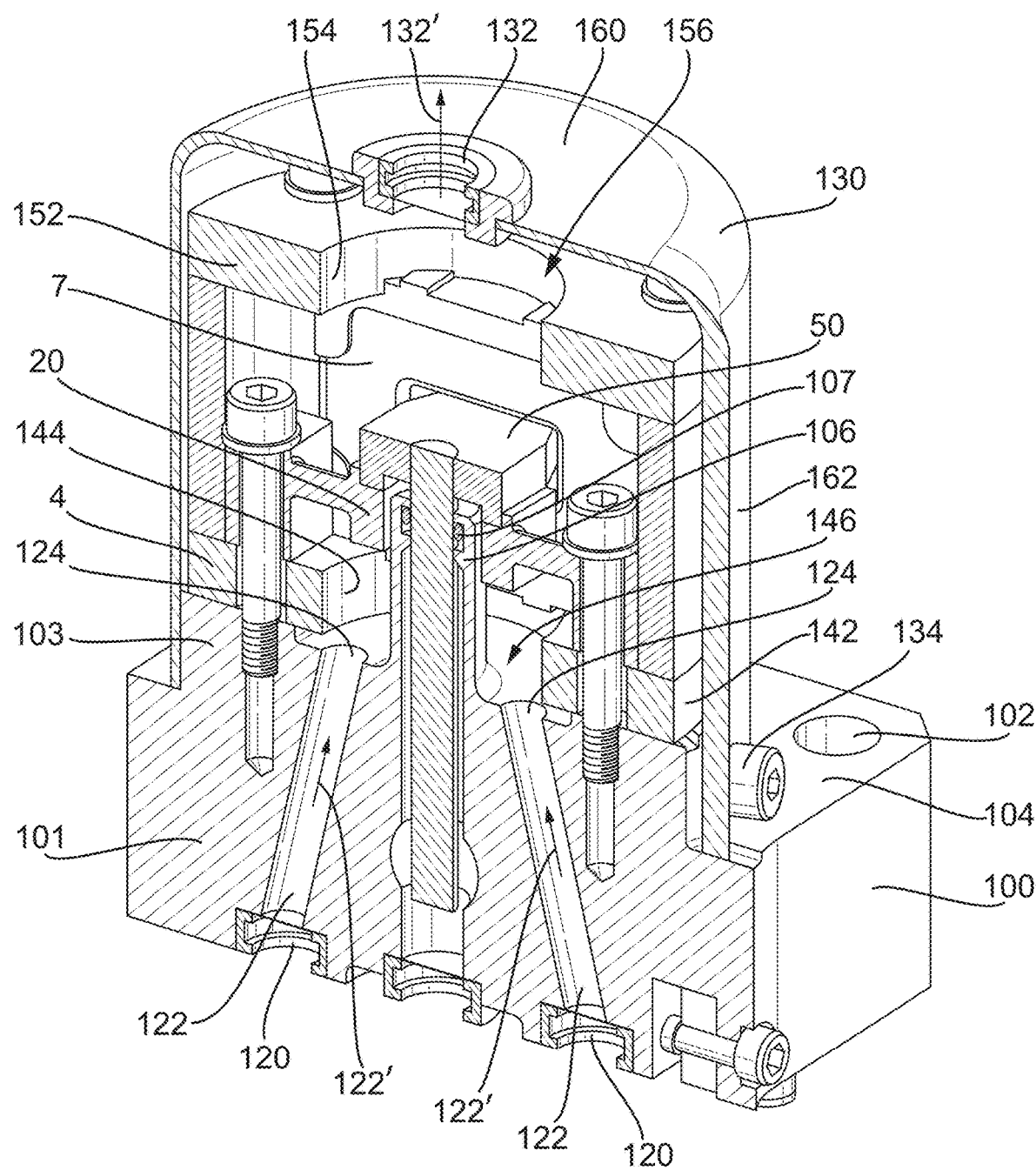
FIG. 6 shows a perspective cross-sectional view of the assembly of FIG. 3.

FIG. 6 shows the direction of cooling fluid through the apparatus including the torque motor 10, enclosed by the body 100 and the cap 130. That is, a fluid (e.g., a cooling fluid such as cooling air) flows into the cooling inlet ports 120 located in the base of the body 100. The cooling air then flows through the cooling passages 122 as indicated by arrows 122'. Due to the outlets 124 of the cooling passages 120 being located radially within the inner radial surface 144 of the lower pole piece 4, as well as the orientation of the cooling passages 122, cooling air then impinges upon the central extension 106 and the torsion bridge 20, as well as the other internal, central components of the torque motor 10. A portion of the cooling air (albeit a smaller portion than that which impinges on the central components) may also impinge on the lower pole piece 4, as well as the other components in the lower part of the torque motor 10, such as the electromagnetic coils 7. Cooling air then flows through the torque motor 10 to be expelled through the cooling outlet port 132 located on the cap 130 in the direction of arrow 132'.

It should be noted that the position of the cooling outlet port 132 is not as critical as the position and orientation of the cooling passages 122, to achieve the desired cooling of the torque motor 10. The location of the cooling outlet port 132 in the illustrated embodiments, although optimal, is not essential for achieving the technical effects and benefits of the broadest aspects of the present disclosure (described below). The cooling outlet port 132 could, for example, be located anywhere on the base 160 of the cap 130 (it does not need to be centrally located, for example) and achieve similar cooling flow through the apparatus. An important aspect of the illustrated embodiment is that cooling air enters the torque motor 10 on a first side of the torque motor 10, travels through the torque motor 10 between the electromagnetic coils 7, and then exits the torque motor 10 on a second, opposite side of the torque motor 10.

It will be appreciated that cooling air from the cooling passages 122 will be directed at least partially onto the central extension 106 from each of the cooling passages 122, since it will exit each cooling passage 122 in a cone shape, and part of the cone of cooling air extending from each of the cooling passages 122 will clearly impinge directly upon at least a portion of the central extension 106 (i.e., without impinging upon any other components). Similarly, a large portion of the cooling air will impinge directly upon the torsion bridge 20.

As well as being positioned so as to direct cooling air through the aperture 146 of the lower pole piece 4, the outlets 124 of the cooling passages 122 may, additionally or alternatively be positioned circumferentially around the central axis A of the flapper 30 such that they cooling air between the electromagnetic coils 7. As can be seen from FIG. 6, for example, the outlets 124 of the cooling passages 122 may be located below (e.g., in a direction parallel to the central axis A) the connecting portions 23 of the torsion bridge 20. When the torque motor 10 is in its assembled state (as shown in, e.g., FIG. 2), a volume will exist between the electromagnetic coils 7, which volume contains, e.g., portions of the torsion bridge 20 and flapper 30. In the illustrated embodiment, the outlets 124 are located such that cooling air is directed into the volume between the electromagnetic coils 7. This further optimises the cooling of the torque motor 10 provided by cooling air flowing through the cooling passages 122.

It is envisaged that the cooling passages 122 could be modified in any suitable manner while still providing the function of cooling the torque motor 10. For example, more or fewer cooling passages could be provided as required for any particular situation, and the cooling passages 122 could take any form within the body 100, as long as they extend from an inlet to an outlet within the interior volume of the cap 130. An array of cooling passages could be provided, for example, that extend around the flapper 30, such that a plurality of outlets are circumferentially spaced around the central extension 106.

Similarly, the cooling outlet port 132 is provided as a single, centrally located port on the base 160 of the cap 130. However, a plurality of outlet ports could be provided, and may be located anywhere on the cap 130 to provide a suitable outlet for cooling air. The illustrated embodiment is seen as an optimum arrangement, although the technical effects of improved cooling in a compact assembly will be achievable with any of the broadest aspects of the present disclosure.

FIGS. 3-6 depict an example of a fuel servovalve, but it will be appreciated that the cooling principles described herein may be applicable to any type of servovalve or torque motor, such as an air servovalve.

The cooling passages 122 may be formed within the body 100 in any suitable manner. For example, each of the cooling passages 122 may be drilled or otherwise machined into the body 100 from the first side of the body 100 to a second, opposite side of the body 100.

Technical effects and benefits of the features described in respect of the present disclosure are that the torque motor can operate in environments of high temperatures. In addition, due to the specific direction(s) of applied cooling air onto the torque motor, it is easy to predict and calculate the temperature distribution that will be experienced within the servovalve. Since the components of the servovalve can operate in higher temperature and for longer periods of time, the shelf life of the components is extended, in particular the fasteners, seals and housing. Due to the reduced thermal expansion of the various components (and differences in thermal expansion properties) wider tolerances may be used for the various fittings within the servovalve, for example the flapper fitting within the body of the servovalve. The technology of the present disclosure can lead to retention of aluminium components, and does not require a large investment in expensive components to achieve operation within a normal temperature range.

Although the present invention has been described with reference to preferred embodiments, it will be understood by those skilled in the art that various changes in form and detail may be made without departing from the scope of the invention as set forth in the accompanying claims.

The invention claimed is:

1. A method of cooling a torque motor comprising a spring, armature, flapper assembly (SAFA) comprising an armature (50) configured to pivot about its center to cause a lower end of a flapper of the assembly to move left and right, the method comprising:
    locating the SAFA on a body;
    locating a cap over the body so as to at least partially enclose the SAFA; and
    providing one or more cooling passages within the body, wherein each cooling passage is configured to direct a fluid at least partially onto the SAFA;
    wherein the body comprises a portion configured to receive the flapper of the SAFA, and the one or more cooling passages are configured to direct the fluid at least partially onto the portion configured to receive the flapper of the SAFA;
    wherein the torque motor further comprises:
        a pole piece;
            wherein each of the one or more cooling passages is configured to direct the fluid through an aperture formed in the center of the pole piece;
        wherein each cooling passage comprises a central axis (X), and the central axis (X) of each cooling passage extends through the aperture of the pole piece.

2. The method as claimed in claim 1, wherein the step of providing one or more cooling passages within the body comprises machining each of the cooling passages into the body from a first side of the body to a second, opposite side of the body.

3. The method as claimed in claim 1, wherein the step of providing one or more cooling passages may comprise providing two cooling passages located on diametrically opposed sides of the flapper of the SAFA.

4. The method as claimed in claim 1, wherein the torque motor comprises a pair of electromagnetic coils, and each of the one or more cooling passages is configured to direct the fluid between the pair of electromagnetic coils.

5. An apparatus comprising:
    a torque motor comprising: a spring, armature, flapper assembly (SAFA) comprising an armature configured to pivot about its center to cause a lower end of a flapper of the SAFA to move left and right;
    a body, wherein the SAFA is mounted onto the body; and
    a cap enclosing the SAFA;
    wherein one or more cooling passages are provided within the body and are configured to receive a fluid and direct the fluid onto the SAFA of the torque motor;
    wherein the body comprises a portion configured to receive the flapper of the SAFA, and the one or more cooling passages are configured to direct the fluid at least partially onto the portion configured to receive the flapper of the SAFA;
    wherein the torque motor further comprises:
        a pole piece;
            wherein each of the one or more cooling passages is configured to direct the fluid through an aperture formed in the center of the pole piece;
        wherein each cooling passage comprises a central axis (X), and the central axis (X) of each cooling passage extends through the aperture of the pole piece.

6. The apparatus as claimed in claim 5, wherein the cap comprises a base and a sidewall extending from the base to a rim,
    wherein the rim is hermetically sealed against a surface of the body.

7. The apparatus as claimed in claim 5, wherein the cap defines an interior volume, the SAFA is located within the interior volume of the cap, and the cooling passages are configured to direct the fluid into the interior volume so as to cool one or more components of the SAFA located within the interior volume.

8. The apparatus as claimed in claim 5, wherein the one or more cooling passages includes at least two cooling passages located on diametrically opposed sides of the flapper of the SAFA.

9. The apparatus as claimed in claim 5, wherein:
the pole piece is a substantially annular member comprising an outer radial surface and an inner radial surface; and
the inner radial surface defines the aperture and an outlet of each of the cooling passages is at least partially located radially inward of the inner radial surface.

10. The apparatus as claimed in claim 5, wherein the cooling passages are configured to direct the fluid onto a first side of the torque motor, the apparatus further comprising:
a fluid outlet located on a second side of the torque motor, wherein the second side of the torque motor is opposite the first side of the torque motor, such that the fluid enters the torque motor on the first side thereof, and exits the torque motor on a second, opposite side thereof.

11. The apparatus as claimed in claim 5, wherein the torque motor comprises a pair of electromagnetic coils, and an outlet of each of the cooling passages is at least partially located between the pair of electromagnetic coils, such that fluid exiting each of the one or more cooling passages in use is directed between the pair of electromagnetic coils.

12. An apparatus as claimed in claim 5, wherein the torque motor comprises a pair of electromagnetic coils, and a volume is defined between the pair of electromagnetic coils, and each of the one or more cooling passages is configured to direct the fluid into the volume defined between the pair of electromagnetic coils.

\* \* \* \* \*